United States Patent
Guo et al.

(10) Patent No.: US 9,871,405 B2
(45) Date of Patent: Jan. 16, 2018

(54) VOLTAGE REGULATING CIRCUIT

(71) Applicant: VOLTRONIC POWER TECHNOLOGY CORP., Taipei (TW)

(72) Inventors: Wei-Jun Guo, Shenzhen (CN); Juor-Ming Hsieh, Taipei (TW)

(73) Assignee: VOLTRONIC POWER TECHNOLOGY CORP., Taipei (TW)

( * ) Notice: Subject to any disclaimer, the term of this patent is extended or adjusted under 35 U.S.C. 154(b) by 94 days.

(21) Appl. No.: 15/063,942

(22) Filed: Mar. 8, 2016

(65) Prior Publication Data
US 2017/0194813 A1    Jul. 6, 2017

(30) Foreign Application Priority Data
Dec. 31, 2015 (CN) ...................... 2015 2 1139971 U

(51) Int. Cl.
*H02J 7/00* (2006.01)
*H02J 9/06* (2006.01)

(52) U.S. Cl.
CPC ................ *H02J 9/06* (2013.01); *H02J 7/007* (2013.01)

(58) Field of Classification Search
CPC .... H02J 9/062; H02J 9/061; H02J 9/06; H02J 3/38; H02J 2003/388; B60L 2200/26; G01R 17/00; G01R 27/02; G01L 9/10
See application file for complete search history.

(56) References Cited

U.S. PATENT DOCUMENTS

| 4,763,013 A * | 8/1988 | Gvoth, Jr. | H02J 9/062 307/46 |
| 5,579,197 A * | 11/1996 | Mengelt | H02J 9/062 307/66 |
| 2004/0036361 A1* | 2/2004 | Dai | H02J 9/062 307/64 |

* cited by examiner

*Primary Examiner* — Long Nguyen
(74) *Attorney, Agent, or Firm* — Li&Cai Intellectual Property (USA) Office

(57) ABSTRACT

Disclosed is a voltage regulating circuit, comprising an input end, an output end, a protecting switch, a first switch, a second switch, a third switch, a first coil and a second coil. The third switch comprises a first terminal and a second terminal. The second terminal of the third switch is connected to a third terminal of the first switch. One end of the first coil is connected to a second terminal of the first switch, and the other end of the first coil is connected to a third terminal of the first switch. One end of the second coil is connected to a first terminal of the third switch, and the other end of the second coil is connected to a fourth terminal of the protecting switch. Different connections between switches and the transformer provide various voltage adjustments to reduce power loss and to increase power transformation efficiency.

10 Claims, 4 Drawing Sheets

VOLTAGE REGULATING CIRCUIT

BACKGROUND OF THE INVENTION

1. Field of the Invention

The instant disclosure relates to a voltage regulating circuit; in particular, to a voltage regulating circuit used in an uninterruptible power supply (UPS) system.

2. Description of Related Art

Currently, in a voltage regulating circuit used in an uninterruptible power supply system, the power loss of coils of a transformer is easily caused because of the connections between the switches and the coils. Even worse, the options to change the connection between the switches and the coils are limited.

SUMMARY OF THE INVENTION

The instant disclosure provides a voltage regulating circuit mainly used in an uninterruptible power supply system. Based on different connections between the switches and the transformer, the voltage regulating circuit provides voltage adjustments in various modes, which effectively reduces the power loss of the coils and increases the power transformation efficiency of the transformer.

The voltage regulating circuit provided by the instant disclosure is used in an uninterruptible power supply system. The voltage regulating circuit comprises an input end and a protecting switch. The input end of the voltage regulating circuit is connected to a utility power, and comprises an input load line and an input neutral line. The protecting switch comprises a first terminal, a second terminal, a third terminal and a fourth terminal, wherein the first terminal of the protecting switch is connected to the input load line and the third terminal of the protecting switch is connected to the input neutral line.

The voltage regulating circuit provided by the instant disclosure further comprises a first switch, a second switch and a third switch. The first switch comprises a first terminal, a second terminal and a third terminal, wherein the first terminal of the first switch is connected to the second terminal of the protecting switch. The second switch comprises a first terminal, a second terminal and a third terminal, wherein the second terminal of the second switch is connected to the second terminal of the first switch and the third terminal of the second switch is connected to the third terminal of the first switch. The third switch comprises a first terminal and a second terminal, wherein the second terminal of the third switch is connected to the third terminal of the first switch.

The voltage regulating circuit provided by the instant disclosure further comprises a first coil, a second coil and an output end. The first coil has one end connected to the second terminal of the first switch and has the other end connected to the third terminal of the first switch. The second coil has one end connected to the first terminal of the third switch and has the other end connected to the fourth terminal of the protecting switch. The output end of the voltage regulating circuit comprises an output load line and an output neutral line.

The voltage regulating circuit provided by the instant disclosure is used in an uninterruptible power supply system. In addition to the voltage regulating circuit, the uninterruptible power supply system further comprises a transformer. The transformer comprises a first coil, a second coil and a third coil. The first coil has one end connected to the second terminal of the first switch and has the other end connected to the third terminal of the first switch. The second coil has one end connected to the first terminal of the third switch and has the other end connected to the fourth terminal of the protecting switch. The third coil is configured side by side with respect to the second coil.

The uninterruptible power supply system further comprises a charger, a battery pack, a bridge inverter and an output end. The charger is connected to the input end, and the battery pack is connected to the charger. The bridge inverter has an input end connected to the battery pack and has an output end connected to the third coil. The output end of the uninterruptible power supply system comprises an output load line and an output neutral line, wherein the output load line is connected to the first terminal of the second switch and the output neutral line is connected to the fourth terminal of the protecting switch. The charger charges the battery pack when the utility power works normally, and the battery pack provides power to the output end of the uninterruptible power supply system via the bridge inverter when the utility power does not work. A controller in the uninterruptible power supply system controls the turning on and off of the first switch, the second switch and the third switch, such that the transformer provides various voltage adjustments in different modes.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The instant disclosure provides a voltage regulating circuit that is mainly used in an uninterruptible power supply system. The voltage regulating circuit can effectively reduce the power loss of coils of a transformer in the uninterruptible power supply system. Also, based on different connections between the switches and the transformer, the voltage regulating circuit provides various voltage adjustments in different modes, which effectively reduces the power loss of the coils, increases the power transformation efficiency of the transformer, and prevents an increase of the coil temperature when the coils are not working.

Figure 1:
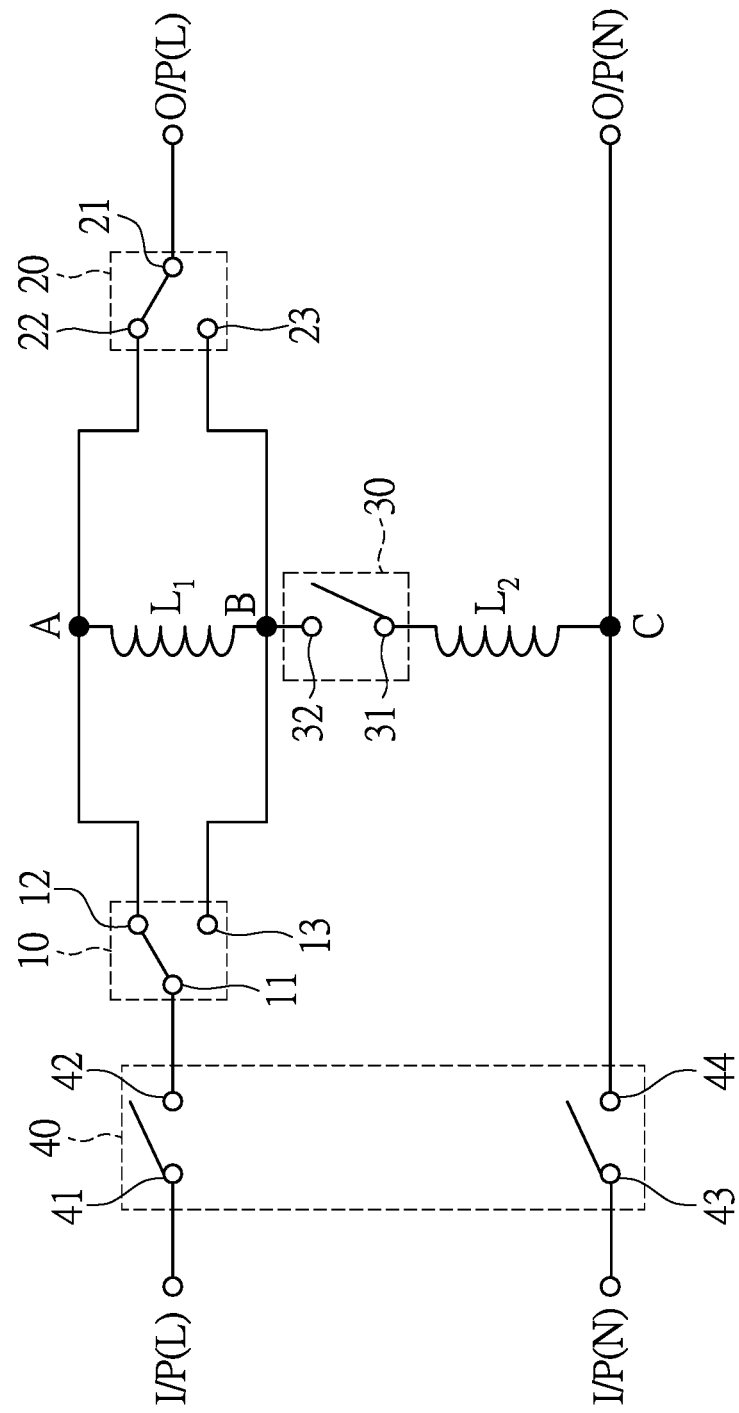
FIG. 1 shows a circuit diagram of a voltage regulating circuit of one embodiment of the instant disclosure.

Refer to FIG. 1. The voltage regulating circuit comprises a first switch 10, a second switch 20, a third switch 30, a protecting switch 40, a first coil L1 and a second coil L2. The voltage regulating circuit has an input end. One end of the input end of the voltage regulating circuit is connected to an input load line I/P(L), and another end of the input end of the voltage regulating circuit is connected to an input neutral line I/P(N). In other words, the input end of the voltage regulating circuit is connected to a utility power. The voltage regulating circuit also has an output end. One end of the output end of the voltage regulating circuit is connected to an output load line O/P(L), and another end of the output end of the voltage regulating circuit is connected to an output neutral line O/P(N).

The input end of the voltage regulating circuit is further connected to the protecting switch 40. The protecting switch 40 comprises a first terminal 41, a second terminal 42, a third terminal 43 and a fourth terminal 44. The input load line I/P(L) is connected to the first terminal 41 of the protecting switch 40, and the input neutral line I/P(N) is connected to the third terminal 43 of the protecting switch 40. When an output voltage, an output current, a coil current or a coil temperature of the voltage regulating circuit is abnormal (e.g. the output voltage, the output current, the coil current of the first coil or the coil current of the second coil of the voltage regulating circuit is too large, or the coil temperature of the first coil or the coil temperature of the seond coil of the voltage regulating circuit is too high), the protecting switch 40 is cut off to make the voltage regulating circuit form an open circuit, such that the entire voltage regulating circuit does not work.

As shown in FIG. 1, the first switch 10 comprises a first terminal 11, a second terminal 12 and a third terminal 13. The second switch 20 comprises a first terminal 21, a second terminal 22 and a third terminal 23. The third switch 30 comprises a first terminal 31 and a second terminal 32. One end of the first coil L1 is the node A, and the other end of the first coil L1 is the node B. One end of the second coil L2 is connected to the first terminal 31 of the third switch 30, and the other end of the second coil L2 is the node C.

The first terminal 11 of the first switch 10 is connected to the second terminal 42 of the protecting switch 40. The second terminal 12 of the first switch 10 is connected to the second terminal 22 of the second switch 20 by both of them connecting to the node A. The third terminal 13 of the first switch 10 is connected to the third terminal 23 of the second switch 20 by both of them connecting to the node B. The node B is further connected to the second terminal 32 of the third switch 30. The fourth terminal 44 of the protecting switch 40 is connected to the output neutral line O/P(N) by both of them connecting to the node C. The first terminal 21 of the second switch 20 is connected to the output load line O/P(L).

According to the above described circuit element connections, there are four different ways to connect the switches and the coils based on the various ways to switch the first switch 10 and the second switch 20. In addition, based on the different ways to switch the first switch 10, the second switch 20 and third switch 30, there are eight various ways to connect the switches and the coils. Particularly, the third switch 30 is connected between the first coil L1 and the second coil L2, such that the first coil L1 and the second coil L2 of the voltage regulating circuit can provide various voltage adjustments in different modes, which effectively reduces the power loss of the coils, increases the power transformation efficiency of the transformer, and prevents an increase of the coil temperature when the coils are not working.

In practice, in the voltage regulating circuit provided by this embodiment, the first switch 10, the second switch 20 and the third switch 30 are controlled by one controller (not shown) to provide various voltage adjustments in different modes. The controller is configured in an uninterruptible power supply system. The controller can be a control chip, a micro controller, a micro-processor, a central processing unit or a single chip microcontroller, but it is not limited herein. The controller controls the ways to switch the first switch 10, the second switch 20 and the third switch 30 to form different connections between the switches and the coils. In an example, the first terminal 11 and the second terminal 12 of the first switch 10 are connected, the first terminal 21 and the third terminal 23 of the second switch 20 are connected, and the first terminal 31 and the second terminal 32 of the third switch 30 are connected. However, in addition to the above example, there are still seven other ways to switch the first switch 10, the second switch 20 and the third switch 30.

Figure 2:
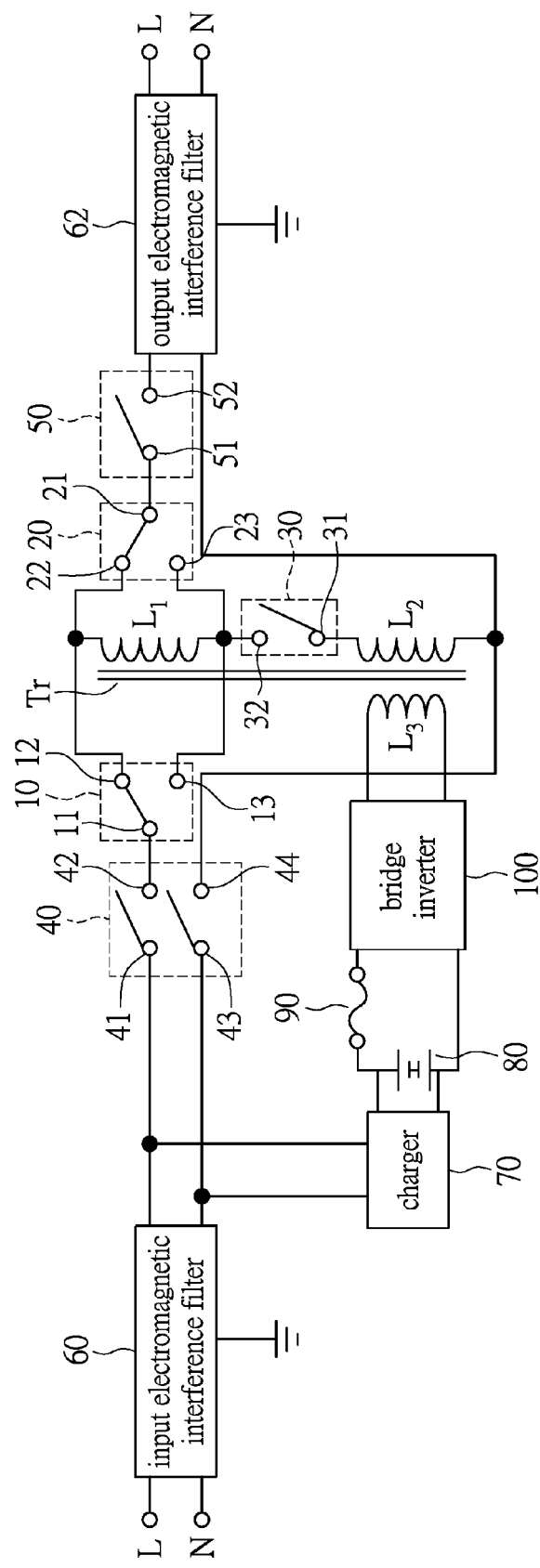
FIG. 2 shows a circuit diagram of an uninterruptible power supply system of one embodiment of the instant disclosure.

FIG. 2 indicates how the voltage regulating circuit shown in FIG. 1 is used in an uninterruptible power supply system 1. In addition to the first switch 10, the second switch 20, the third switch 30 and the protecting switch 40, the uninterruptible power supply system 1 further comprises a transformer Tr. In addition to the first coil L1 and the second coil L2, the transformer Tr further comprises a third coil L3. The third coil L3 is configured side by side with respect to the second coil L2. The uninterruptible power supply system 1 further comprises an output end 50, an input electromagnetic interference filter 60, an output electromagnetic interference filter 62, a charger 70, a battery pack 80, a safety switch 90 and a bridge inverter 100.

One end of the input end of the uninterruptible power supply system 1 is connected to a load line L of the utility power, and another end of the uninterruptible power supply system 1 is connected to a neutral line N of the utility power. Likewise, one end of the output end of the uninterruptible power supply system 1 is connected to a load line L, and another end of the uninterruptible power supply system 1 is connected to a neutral line N. The input end of the uninterruptible power supply system 1 is connected to the input electromagnetic interference filter 60 for removing the signal interference caused by the electromagnetic waves. It is worth mentioning that, in practice, the input electromagnetic interference filter 60 is an optional element in the uninterruptible power supply system 1. In addition to the input electromagnetic interference filter 60, the input end of the uninterruptible power supply system 1 is further connected to the protecting switch 40 to protect the uninterruptible power supply system 1 from abnormal situations by forcing it to stop working. The abnormal situations may occur when the coil temperature is too high or when the output voltage, the coil current or the output current of the voltage regulating circuit is too large. Moreover, and output end of the input electromagnetic interference filter 60 is connected to the charger 70 and the charger 70 is connected to a battery pack 80, such that the battery pack 80 can be normally charged by the utility power.

The battery pack 80 is connected to the safety switch 90 serially. When the utility power is cut, the battery pack 80 provides power to the uninterruptible power supply system 1 instead. Under this circumstance, the safety switch 90 will be cut off when the output current of the battery 80 is too large, to prevent the entire circuit from damaging. In practice, the safety switch 90 is an optional element in the uninterruptible power supply system 1. In addition to the safety switch 90, the battery pack 80 is further connected to the bridge inverter 100, and the output of the bridge inverter 100 is connected to the third coil L3 of the transformer Tr. When the uninterruptible power supply system 1 is working, the power provided by the battery pack 80 is transmitted to the third coil L3 via the bridge inverter 100. Based on the Faraday's Law, the transformer Tr generates an induced power. The induced power is then transmitted to the second switch 20, to the output switch 50, to the output electromagnetic interference filter 62, and finally to a load line L and a neutral line N. It is worth mentioning that, the output electromagnetic interference filter 62 is an optional element in the uninterruptible power supply system 1. As long as the output switch 50 is cut off (e.g. the first terminal 51 and the second terminal 52 of the output switch 50 form an open circuit), the uninterruptible power supply system 1 can stop providing power to the output end. It is also worth mentioning that, the output switch 50 is an optional element in the uninterruptible power supply system 1.

In practice, in the uninterruptible power supply system 1 provided by this embodiment, the first switch 10, the second switch 20 and the third switch 30 are controlled by one controller (not shown) to provide various voltage adjustments in different modes. The controller is configured in an uninterruptible power supply system. The controller can be a control chip, a micro controller, a micro-processor, a central processing unit or a single chip microcontroller, but it is not limited herein. The controller controls the ways to switch the first switch 10, the second switch 20 and the third switch 30 to form different connections between the switches and the coils L1~L3 of the transformer Tr.

Figure 3:
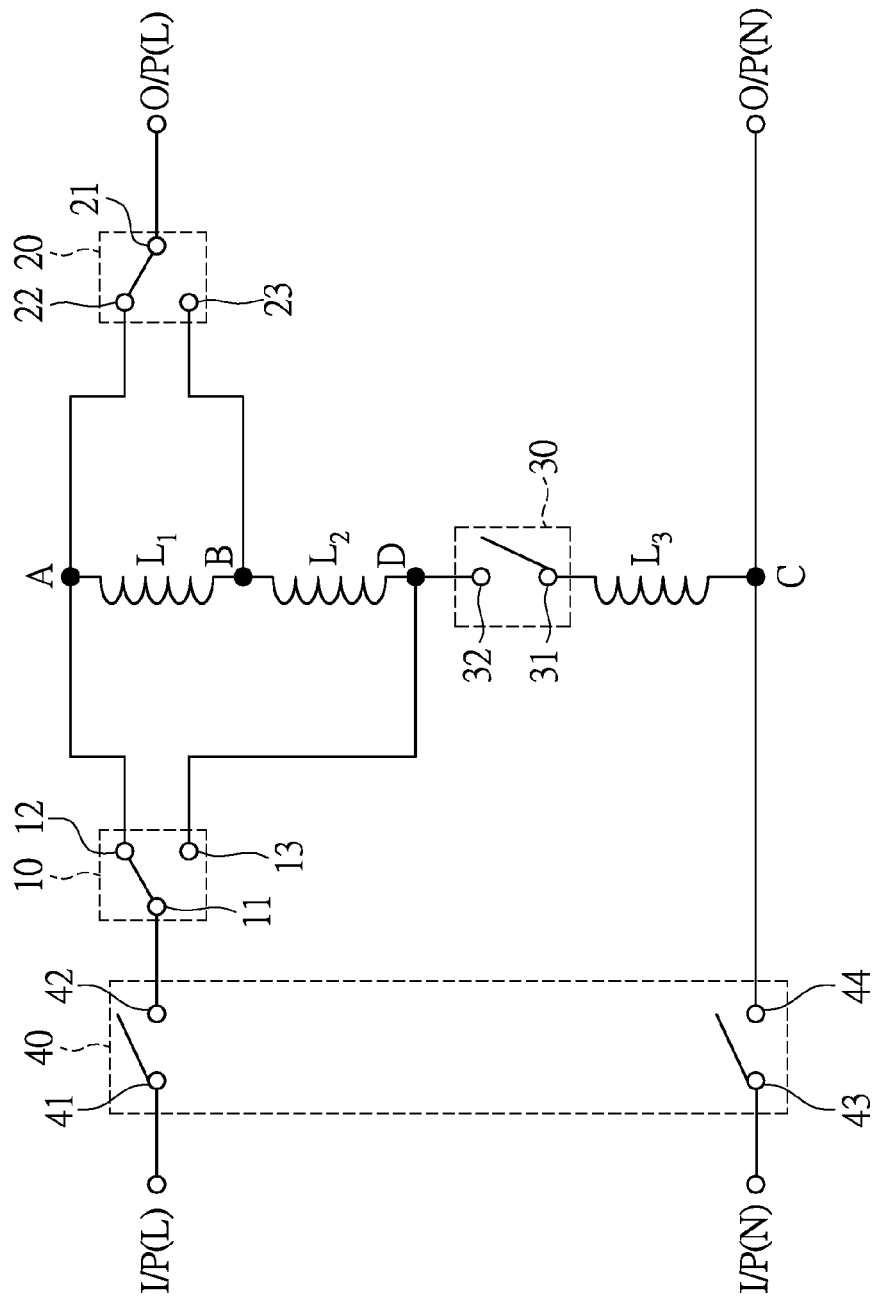
FIG. 3 shows a circuit diagram of a voltage regulating circuit of the third embodiment of the instant disclosure.

FIG. 3 shows a circuit diagram of a voltage regulating circuit of the third embodiment of the instant disclosure. The voltage regulating circuit provided in this embodiment is used in an uninterruptible power supply system. The voltage regulating circuit provided in this embodiment comprises an input end that is connected to a utility power. The input end of the voltage regulating circuit has an input load line I/P(L) and an input neutral line I/P(N). Also, the voltage regulating circuit provided in this embodiment comprises an output end, wherein the output end of the voltage regulating circuit has an output load line O/P(L) and an output neutral line O/P(N).

In this embodiment, the voltage regulating circuit also comprises a protecting switch 40, a first switch 10, a second switch 20, a third switch 30, a first coil L1, a second coil L2 and a third coil L3. The protecting switch 40 has a first terminal 41, a second terminal 42, a third terminal 43 and a fourth terminal 44. The first terminal 41 of the protecting switch 40 is connected to an input load line I/P(L), and the third terminal 43 of the protecting switch 40 is connected to an input neutral line I/P(N).

The first switch 10 has a first terminal 11, a second terminal 12 and a third terminal 13. The first terminal 11 of the first switch 10 is connected to the second terminal 42 of the protecting switch 40. The second switch 20 has a first terminal 21, a second terminal 22 and a third terminal 23. The second terminal 22 of the second switch 20 is connected to the second terminal 12 of the first switch 10 by both of them connecting to the node A. The third switch 30 has a first terminal 31 and a second terminal 32. The second terminal 32 of the third switch 30 is connected to the third terminal 13 of the first switch 10 by both of them connecting to the node D.

As shown in FIG. 3, one end of the first coil L1 is connected to the second terminal 12 of the first switch 10 by both of them connecting to the node A, and the other end of the first coil L1 is connected to the third terminal 23 of the second switch 20 by both of them connecting to the node B. One end of the second coil L2 is connected to the third terminal 23 of the second switch 20 by both of them connecting to the node B, and the other end of the second coil L2 is connected to the third terminal 13 of the first switch 10 by both of them connecting to the node D. One end of the third coil L3 is connected to the first terminal 31 of the third switch 30, and the other end of the third coil L3 is connected to the fourth terminal 44 of the protecting switch 40 by both of them connecting to the node C. The fourth terminal 44 of the protecting switch 40 is connected to the output neutral line O/P(N) by both of them connecting to the node C. The first terminal 21 of the second switch 20 is connected to the output load line O/P(L).

Figure 4:
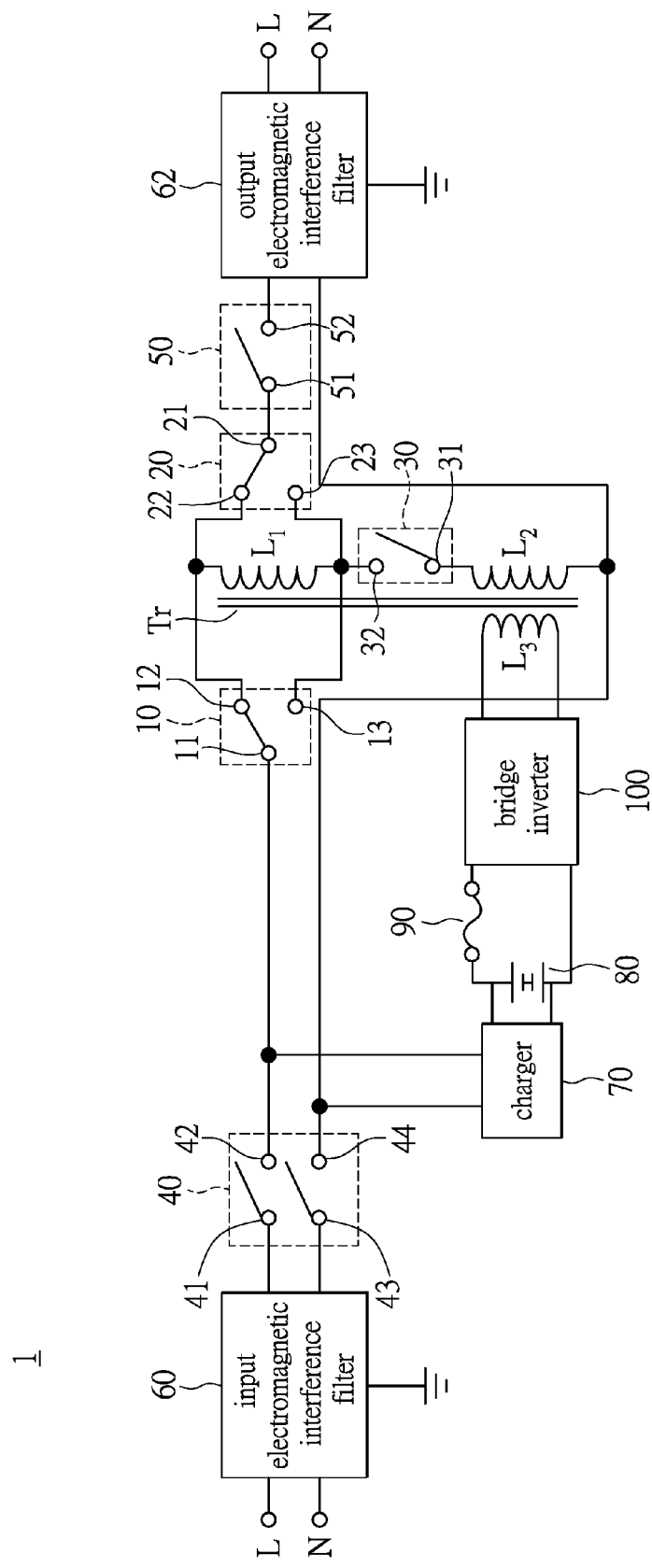
FIG. 4 shows a circuit diagram of an uninterruptible power supply system of the fourth embodiment of the instant disclosure.

FIG. 4 shows a circuit diagram of an uninterruptible power supply system of the fourth embodiment of the instant disclosure. There is an improvement in the uninterruptible power supply system 1 provided by this embodiment based on the uninterruptible power supply system 1 shown in FIG. 2. The improvement is to change the connection relationships for the terminals of the protecting switch 40. In detail, the first terminal 41 and the third terminal 43 of the protecting switch 40 are connected to the input electromagnetic interference filter 60. The second terminal 42 of the protecting switch 40 is connected to the first terminal 11 of the first switch 10 and one end of the charger 70. The fourth terminal 44 of the protecting switch 40 is connected to the output electromagnetic interference filter 62, one end of the second coil L2 and one end of the charger 70. Likewise, when the uninterruptible power supply system 1 is working abnormally, the protecting switch 40 connected to the input electromagnetic interference filter 60 is cut off to form an open circuit for protecting the back end circuit of the uninterruptible power supply system 1 from damage.

To sum up, in the voltage regulating circuit of the uninterruptible power supply system provided by embodiments of the instant disclosure, the first switch, the second switch and the third switch are controlled to have different connections with the first coil, the second coil and the third coil. According to different connections between the switches and the coils, there are various output voltages of the voltage regulating circuit, which helps to decrease the power loss of coils, to increase the power transformation efficiency, and to prevent an increase of the coil temperature when the coils are not working.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A voltage regulating circuit, used in an uninterruptible power supply system, comprising:
    an input end, connected to a utility power, comprising an input load line and an input neutral line;
    a protecting switch, comprising a first terminal, a second terminal, a third terminal and a fourth terminal, wherein the first terminal of the protecting switch is connected to the input load line and the third terminal of the protecting switch is connected to the input neutral line;
    a first switch, comprising a first terminal, a second terminal and a third terminal, wherein the first terminal of the first switch is connected to the second terminal of the protecting switch;
    a second switch, comprising a first terminal, a second terminal and a third terminal, wherein the second terminal of the second switch is connected to the second terminal of the first switch, and the third terminal of the second switch is connected to the third terminal of the first switch;

a third switch, comprising a first terminal and a second terminal, wherein the second terminal of the third switch is connected to the third terminal of the first switch;

a first coil, having one end connected to the second terminal of the first switch and having the other end connected to the third terminal of the first switch;

a second coil, having one end connected to the first terminal of the third switch and having the other end connected to the fourth terminal of the protecting switch; and an output end, comprising an output load line and an output neutral line.

2. The voltage regulating circuit according to claim 1, wherein the fourth terminal of the protecting switch is connected to the output neutral line.

3. The voltage regulating circuit according to claim 1, wherein the first terminal of the second switch is connected to the output load line.

4. The voltage regulating circuit according to claim 1, wherein when an output voltage, an output current, a coil current of the first coil, a coil current of the second coil, a coil temperature of the first coil or a coil temperature of the second coil of the voltage regulating circuit is abnormal, the protecting switch is cut off to make the voltage regulating circuit form an open circuit.

5. The voltage regulating circuit according to claim 1, wherein an input electromagnetic interference filter is configured at the input end of the voltage regulating circuit, and an output electromagnetic interference filter is configured at the output end of the voltage regulating circuit.

6. An uninterruptible power supply system, comprising:
an input end, connected to a utility power, comprising an input load line and an input neutral line;
a protecting switch, comprising a first terminal, a second terminal, a third terminal and a fourth terminal, wherein the first terminal of the protecting switch is connected to the input load line, and the third terminal of the protecting switch is connected to the input neutral line;
a first switch, comprising a first terminal, a second terminal and a third terminal, wherein the first terminal of the first switch is connected to the second terminal of the protecting switch;
a second switch, comprising a first terminal, a second terminal and a third terminal, wherein the second terminal of the second switch is connected to the second terminal of the first switch, and the third terminal of the second switch is connected to the third terminal of the first switch;
a third switch, comprising a first terminal and a second terminal, wherein the second terminal of the third switch is connected to the third terminal of the first switch;
a transformer, comprising:
  a first coil, having one end connected to the second terminal of the first switch and having the other end connected to the third terminal of the first switch;
  a second coil, having one end connected to the first terminal of the third switch and having the other end connected to the fourth terminal of the protecting switch; and
  a third coil, configured side by side with respect to the second coil;
a charger, connected to the input end of the uninterruptible power supply system;
a battery pack, connected to the charger;
a bridge inverter, having an input and an output, the input of the bridge inverter connected to the battery pack, the output of the bridge inverter connected to the third coil; and
an output end, comprising an output load line and an output neutral line, wherein the output load line is connected to the first terminal of the second switch and the output neutral line is connected to the fourth terminal of the protecting switch;
wherein the charger charges the battery pack when the utility power is working normally, the battery pack provides power to the output end via the bridge inverter when the utility power does not work, and a controller in the uninterruptible power supply system controls the turning on and off of the first switch, the second switch and the third switch such that the transformer provides various voltage adjustments in different modes.

7. The uninterruptible power supply system according to claim 6, wherein when an output voltage, an output current, a coil current or a coil temperature of the voltage regulating circuit is abnormal, the protecting switch is cut off to make the voltage regulating circuit form an open circuit.

8. The uninterruptible power supply system according to claim 6, wherein the input end of the uninterruptible power supply system is further connected to an input electromagnetic interference filter, the output end of the uninterruptible power supply system is further connected to an output electromagnetic interference filter, the output load line is further connected to an output switch, and the battery pack is further connected to a safety switch serially.

9. The uninterruptible power supply system according to claim 8, wherein the first terminal and the third terminal of the protecting switch are connected to an output end of the input electromagnetic interference filter instead of the input load line and the input neutral line, the second terminal of the protecting switch is connected to the first terminal of the first switch and one end of the charger instead of the first terminal of the first switch, and the fourth terminal of the protecting switch is connected to the output electromagnetic interference filter and another end of the charger instead of the third coil and the output neutral line.

10. A voltage regulating circuit, used in an uninterruptible power supply system, comprising:
an input end, connected to a utility power, comprising an input load line and an input neutral line;
a protecting switch, comprising a first terminal, a second terminal, a third terminal and a fourth terminal, wherein the first terminal of the protecting switch is connected to the input load line and the third terminal of the protecting switch is connected to the input neutral line;
a first switch, comprising a first terminal, a second terminal and a third terminal, wherein the first terminal of the first switch is connected to the second terminal of the protecting switch;
a second switch, comprising a first terminal, a second terminal and a third terminal, wherein the second terminal of the second switch is connected to the second terminal of the first switch;
a third switch, comprising a first terminal and a second terminal, wherein the second terminal of the third switch is connected to the third terminal of the first switch;
a first coil, having one end connected to the second terminal of the first switch and having the other end connected to the third terminal of the second switch;

a second coil, having one end connected to the third terminal of the second switch and having the other end connected to the third terminal of the first switch;

a third coil, having one end connected to the first terminal of the third switch and having the other end connected to the fourth terminal of the protecting switch; and an output end, comprising an output load line and an output neutral line;

wherein the fourth terminal of the protecting switch is connected to the output neutral line and the first terminal of the second switch is connected to the output load line.

* * * * *